Sept. 20, 1971     S. G. HARRIS ET AL     3,605,180
APPARATUS AND METHOD FOR SHUCKING OYSTERS
Filed Sept. 30, 1968     7 Sheets-Sheet 1

INVENTORS,
STERLING G. HARRIS
BEN P. ZOBER

INVENTORS,
STERLING G. HARRIS
BEN P. ZOBER

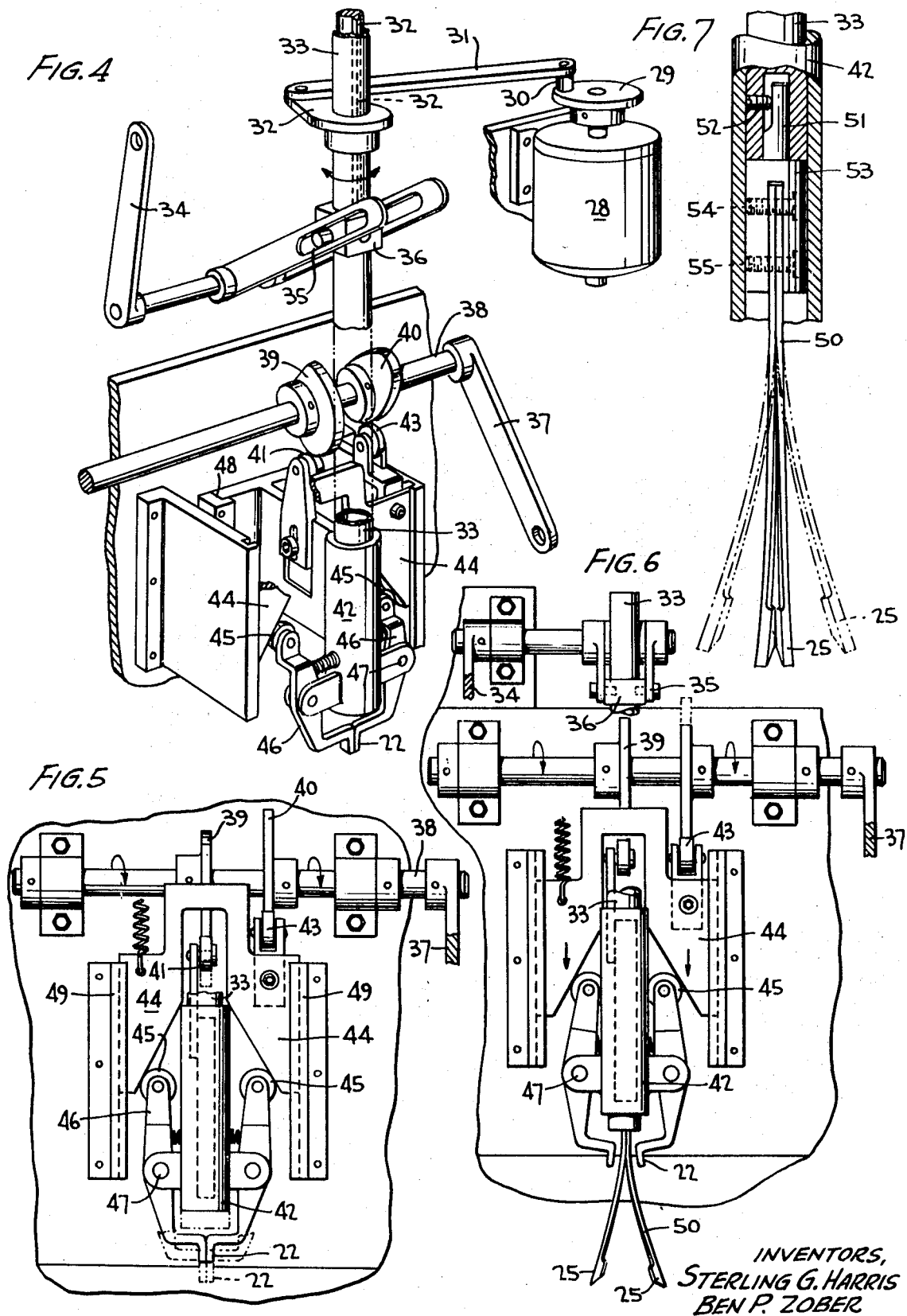

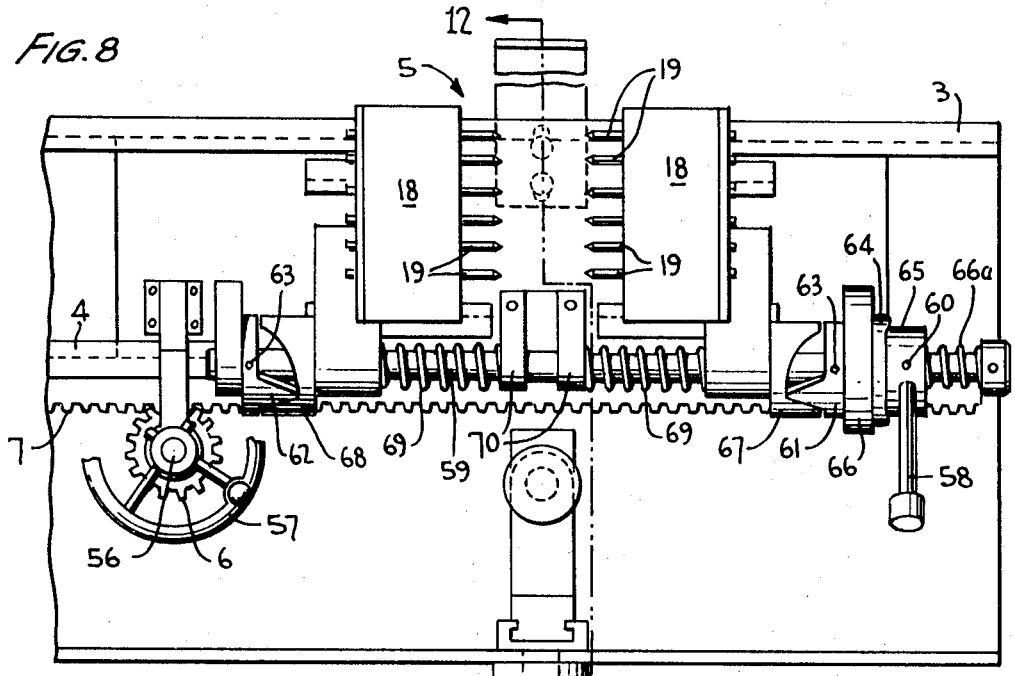
FIG. 8
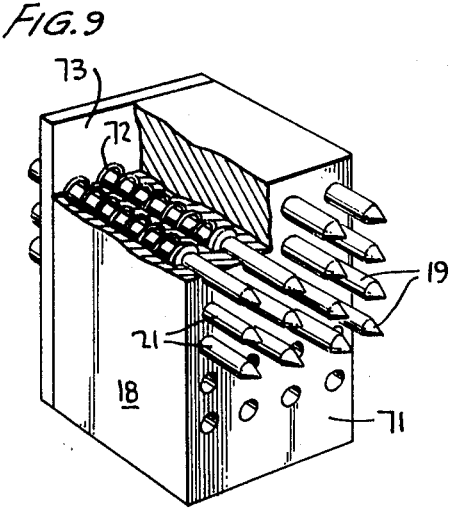
FIG. 9
FIG. 11
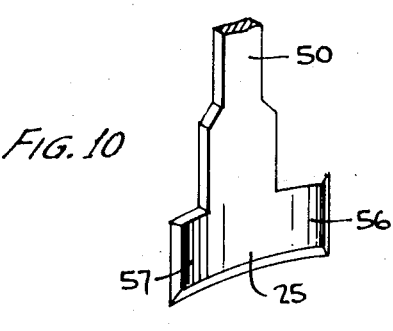
FIG. 10
INVENTORS,
STERLING G. HARRIS
BEN P. ZOBER

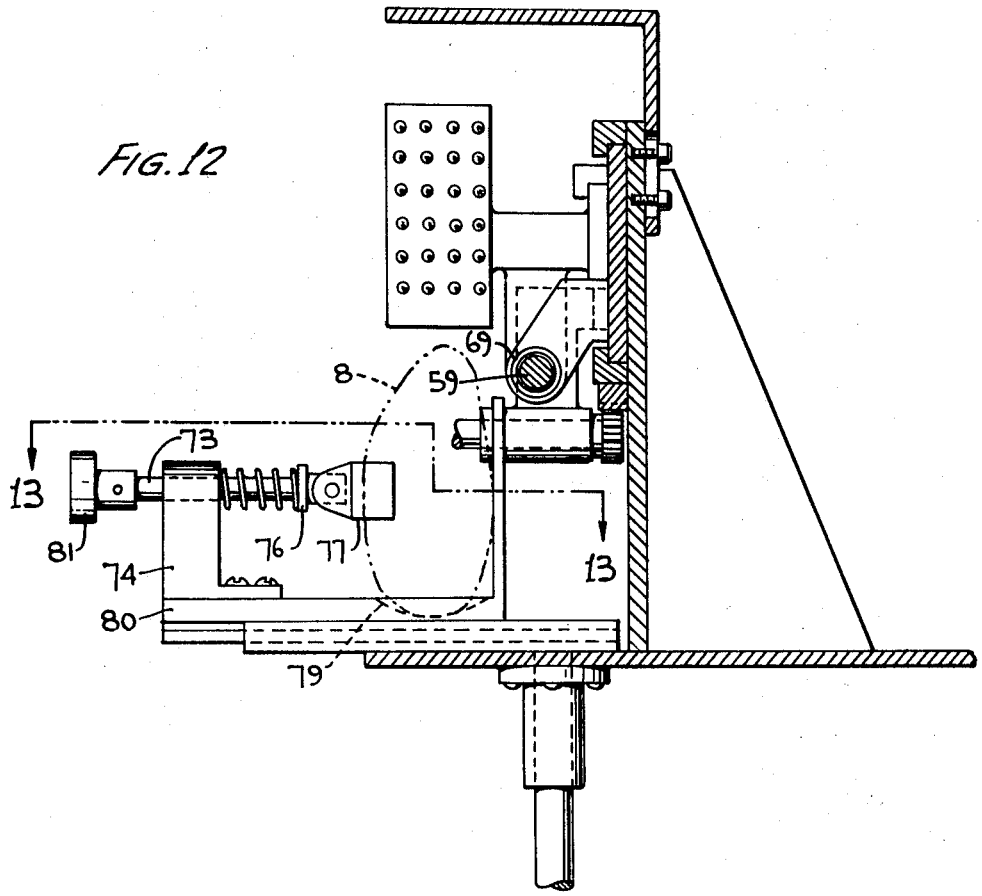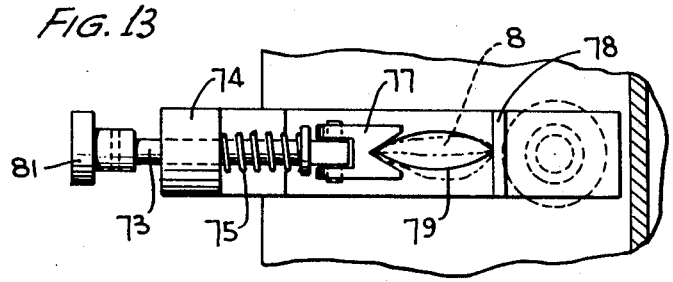

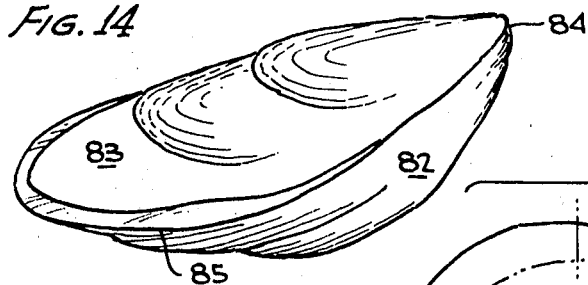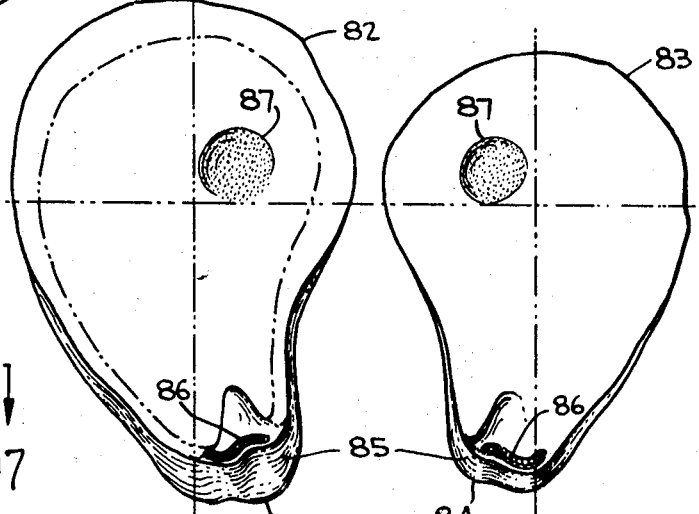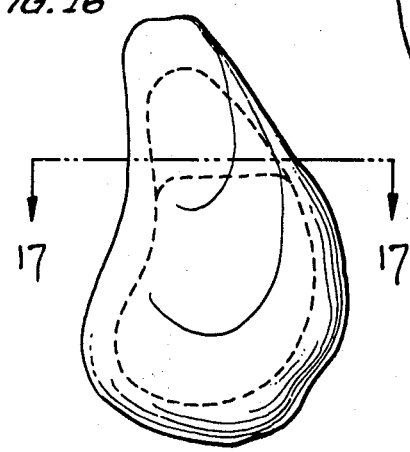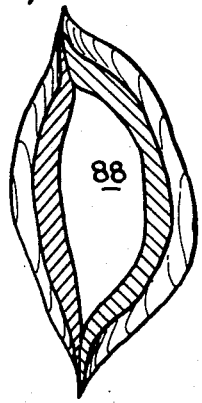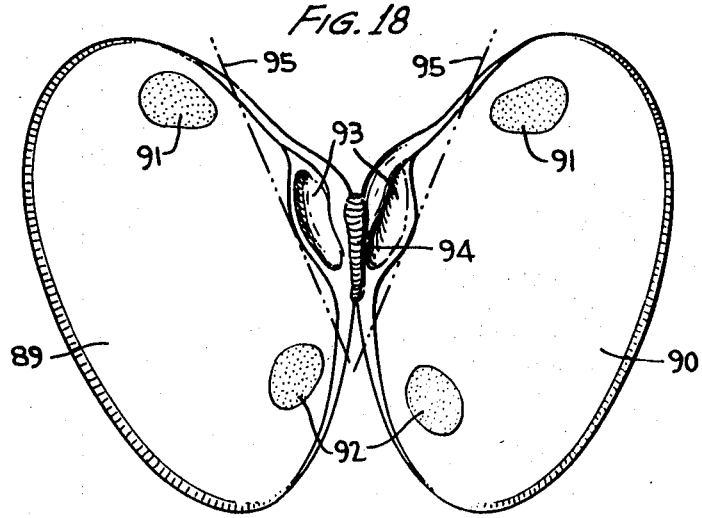

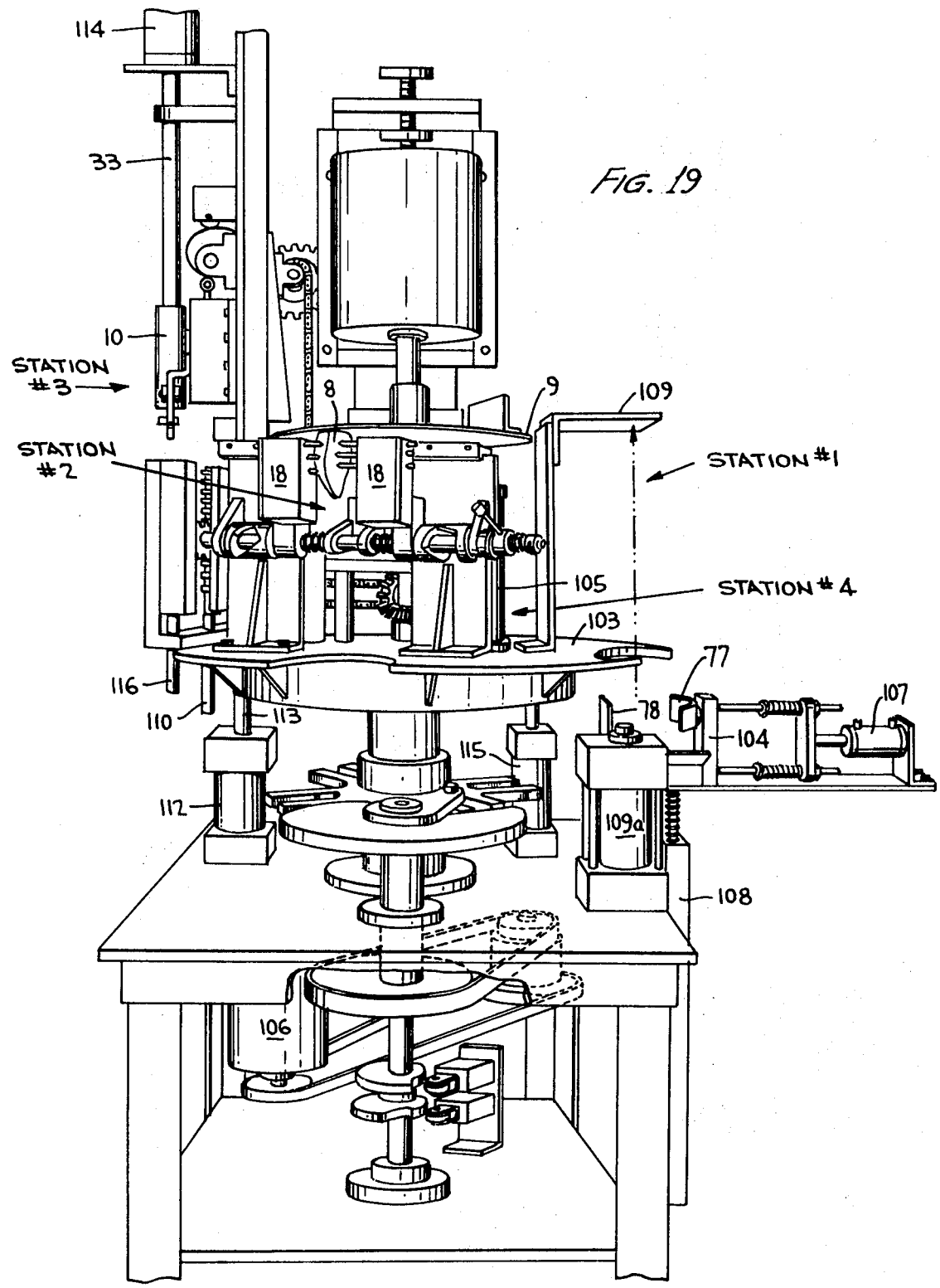

United States Patent Office 3,605,180
Patented Sept. 20, 1971

3,605,180
APPARATUS AND METHOD FOR SHUCKING OYSTERS
Sterling G. Harris, Beaufort, and Ben P. Zober, Charleston, S.C., assignors to Harris Automated Machinery Co., Dover, Del.
Filed Sept. 30, 1968, Ser. No. 763,816
Int. Cl. A22c 29/00
U.S. Cl. 17—74                     19 Claims

ABSTRACT OF THE DISCLOSURE

This invention pertains to shucking fresh bivalves and it encompasses both an apparatus and method which removes rapidly, and without damage, the edible portion of the bivalve. The invention consists of removing a portion of the shells of the bivalve (preferably after some of the fluids contained in the bivable cavity have been eliminated particularly in the case of oysters), thereafter severing muscles of the bivalve which connect the meat to the shells, and finally separating the meat and the shells, and the apparatus for accomplishing the foregoing operation. The invention pertains to bivables in general but is especially useful in the shucking of oysters and clams.

BACKGROUND OF THE INVENTION

(1) Field of the invention

Despite the continuous efforts from early times to devise a mechanical method for shucking bivalves, particularly oysters and clams, shucking by hand continues to be the only commercially feasible means for removing in the uncooked fresh condition the meat from these particular mollusks. The problem of shucking bivalves is steadily becoming more acute with the growing storage of skilled shuckers and the steady rise in their wages. The absence of and great need for a good mechanical shucker has been publicized by the United States Department of Interior and by the Maryland Chesapeake Bay Affairs Commision; the revival of the now declining oyster and clam industries along the Atlantic, Gulf, and Pacific Coasts of the United States has been declared to depend upon the development of such a shucker. This long-felt need is recognized throughout the industry.

(2) Description of the prior art

The prior art teaches the limited opening of bivalves by electric shock, by micro-electronic waves, by heating or freezing, by the use of chemical compounds, by counter-rotation of the upper and lower portion of portions of the oyster and clam shells, by cutting, grinding, or chipping the shells to facilitate insertion of the shucker's knife. See U.S. Pats. Nos. 848,608; 10,810; 3,206,796; 2,000,-075; 2,473,609; 3,239,877; 3,013,884 and 3,070,834. However, as stated, the problem of shucking (both opening and cutting the meat free from the shells) by mechanical means remained unsolved prior to the present invention.

SUMMARY OF THE INVENTION

The present invention is carefully adapted to cope with and exploit details of the physical characteristics of bivalves, particularly oysters and clams, and for the first time to employ an apparatus and method tailored to take advantage of some of the natural features of bivalves which have long been ignored. As stated, a bivalve when subjected to shock or trauma will open slightly. See Harris Patent No. 2,832,989. Heretofore, the object of such shock has been to bring about a sufficient parting between the upper and lower shells to facilitate the entry of a knife to free the meat or to accelerate cooking of the meat.

As one of its features, the present invention utilizes, in the case of oysters, the loss of fluid, commonly referred to as "shell liquor," which invariably accompanies the shocked-induced partial opening of the shells. This fluid consists of the indigenous water and the products of oyster metabolism which is entrapped between the body cavity of the shells and the meat when the shellfish is caught and removed from its habitat. The meat of the bivalves is suspended by flotation in this entrapped fluid.

After the shell liquor, which is sealed between the shells of the closed bivalve, is partly or entirely eliminated, a corresponding volume of free or air space is created. Gravity then causes the flesh of the bivalve to sag into the lowermost portion of the shell cavity, leaving a void or air space in any portion of the bivalve cavity which is held uppermost. By utilizing this principle, and by holding uppermost the portion of the shells which one selects for removal, a substantially greater portion of the shells may be cut away without cutting or damaging the meat than would otherwise be possible if the fluid had not first been removed from the cavity of the bivalve.

The invention also utilizes the fact that the adductor muscles of bivalves of each species are always attached to particular areas of the shells. The invention so positions the bivalve as to (a) permit a large incision to be made in the shells without cutting the meat, and (b) provide an unobstructed path of access to the adductor muscles for the knives which enter through the aperture so formed to sever these muscles. Another feature of the invention is the use of knives which in shape and operation are uniquely designed to follow the contour of the interior surfaces of shells and to cut the muscles at the precise points of their attachment to the shells. A knife assembly based on a pantograph movement for use on bivalves having especially irregulator interior shell contours is a further feature of the invention.

Broadly described, the inventive concept covers the method of holding the bivalve in a selected position with the portion of its shells which are to be removed uppermost, removing the uppermost portions of the two shells, widening the opening so created, cutting the ends of the adductor muscle by instruments which enter through the widened opening, and separating and collecting the meat and the shells. With respect to oysters and clams, some of the fluid is removed from the cavity as a preliminary operation in the preferred embodiment. The invention also extends to means for accomplishing the foregoing steps. With the exception of positioning the bivalves in the carriage and clamp assembly, all of the operations are accomplished mechanically. The invention is carried out in four steps or at four stations which follow:

(1) The initial placement and subsequent holding of the bivalve in a selected position during the entire shucking operation.

(2) The making of a suitable opening in the shells of the bivalve by removal of portions thereof.

(3) The enlargement of the opening by spreading (unnecessary in large oysters and clams), the cutting of the adductor muscles, and the separation of the edible portion of the bivalve from its shell.

(4) The release of the empty shells from the apparatus at a selected location.

For simplicity, the apparatus which will hereinafter be described as the preferred embodiment is a hand operated machine with the four stations arranged along a straight horizontal conveyor track. Any other well-known mechanical movement whereby the successive steps which comprise the invention are performed may also be employed in practicing the invention. For example, highly successful results have been obtained by the use of a Geneva mechanism having the same four basic stations activated penumatically and an illustration of such a machine is shown in FIG. 19. The invention is not, therefore, restricted to any particular mechanisms by which the bivalve is moved from one station to another, but extends to any mechanism which may be employed to carry out the steps which are disclosed herein.

Since the method and apparatus which comprises the invention, mechanize the shucking of bivalves, the invention is useful in any operation wherein bivalves have heretofore been shucked only by hand. For example, it is suitable for use in raw bars and especially in sea food packing houses which shuck and package large volumes of fresh or subsequently frozen bivalves for consumption at other locations. While the main advantage of the invention is the economy of mechanical over hand shucking, a bivalve which is processed according to the invention is at least comparable in quality to the best result achieved by hand shucking. A significant portion of hand opened bivalves is mutilated because of the lack of skill of many of the shuckers who are employed by seafood houses, and this factor detracts from quality, value and marketability. By practicing this invention the adductor muscles are severed very close to the shells to which they are attached insuring recovery of all of the meat without damage.

The invention is also adaptable for the mechanical preparation of oysters and clams on the half shell.

BRIEF DESCRIPTION OF THE DRAWINGS

FIG. 4 is a perspective of portion of machine at Sta. 3.
FIG. 5 is a front elevation of portion of machine at Sta. 3, with spreader movement in down position.
FIG. 6, front elevation of portion of machine at Sta. 3 with knives extended to position of cutting muscle.
FIG. 7, knife blades enlarged.
FIG. 8, front elevation of Sta. 1.
FIG. 9, enlarged perspective of one holding clamp.
FIG. 10, fragmentary view of knife blade.
FIG. 11, cross-section of pantograph knife mechanism.
FIG. 12, section taken through line 12—12 on FIG. 8.
FIG. 13, section taken on line 13—13 on FIG. 12.
FIG. 14, typical oyster showing top and bottom shells.
FIG. 15, oyster opened.
FIG. 16, typical oyster showing two positions of meat before and after shocking.
FIG. 17, section taken through line 17—17 of FIG. 16.
FIG. 18, clam shells opened showing diamond blade cut line prior to removal of meat.
FIG. 19, invention as carried out by pneumatically activated Geneva mechanism.

GENERAL DESCRIPTION

Figures 1, 2:
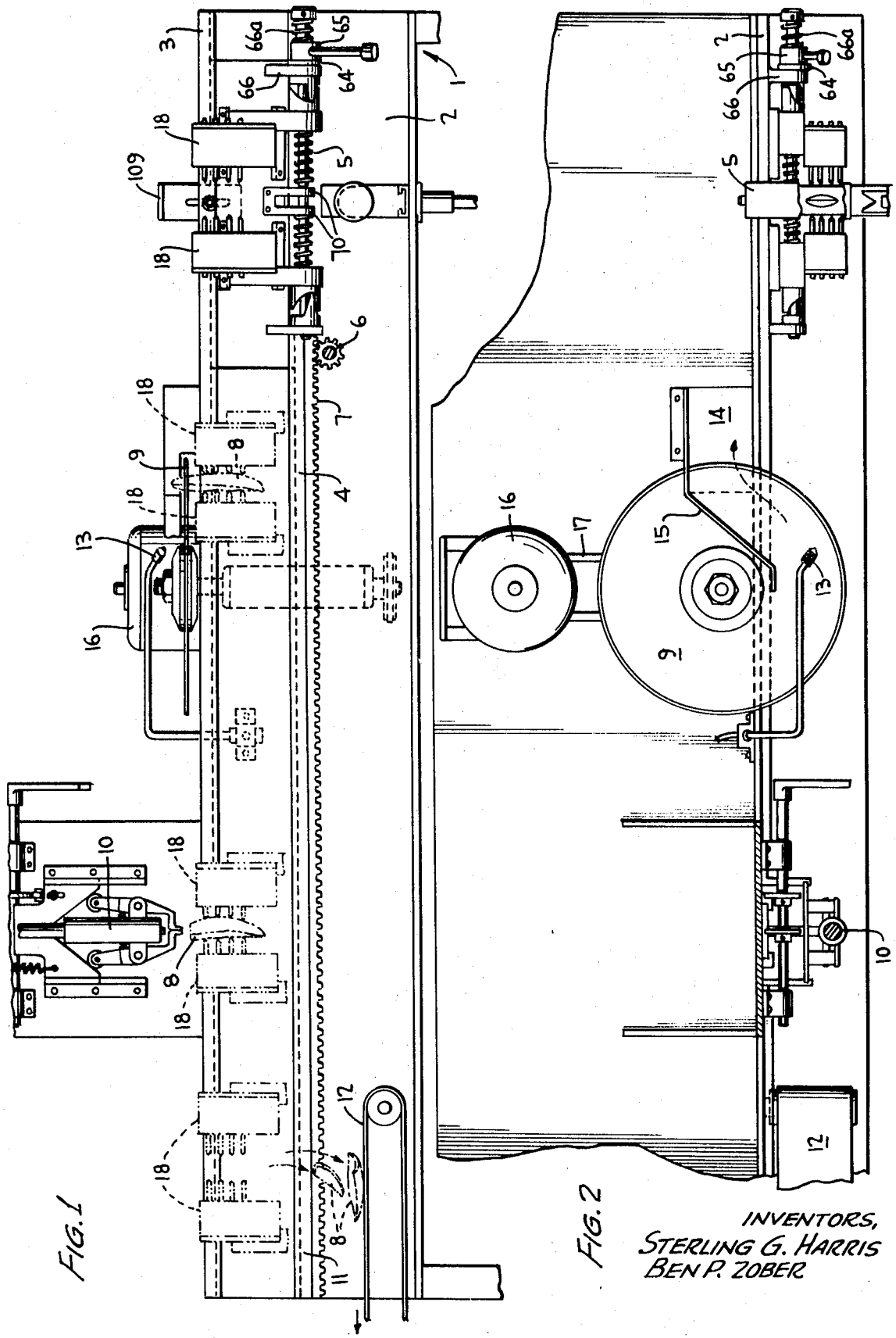
FIG. 1 is a side elevation.
FIG. 2 is a plan view.

FIGS. 1 and 2 show the front elevation and plan view, respectively, of an interrelated series of four principal mechanisms which constitute the invention and the means by which the process disclosed is practiced. Referring to FIG. 1, the machine is supported by a table-like floor stand 1. The frame or chassis 2 has an upper and lower track 3 and 4 to which the carriage and clamp assembly 5 is attached, so as to be movable by means of pinion 6 and rack 7 back and forth along the entire length of chassis 2, so as to bring the bivalve 8 into contact with the diamond cutting blade 9 and the combined spreader of the shells and knife unit 10, and thereafter the empty shell release mechanism 11. Conveyor belt 12 receives the empty shell of bivalve 8. Water spray nozzle 13, shell scrap bin 14, shell scrap deflector 15, blade motor 16, and belt 17 are also shown.

FIG. 3a through g shows the sequence of operations from the front of the machine where the bivalve 8, an oyster with hinge uppermost and bottom shell of oyster toward the right and top shell on the left, is placed in bivalve carriage and clamp assembly 5 until the empty shells are released therefrom.

Figure 3A:
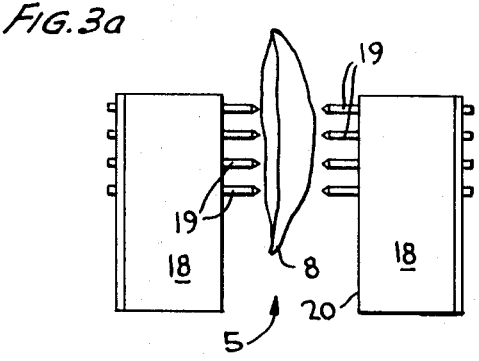
FIG. 3a–g shows the sequence of operations.

In FIG. 3a each of the two clamps, shown in fully open position, have pointed spring-loaded compressible spikes 19 perpendicular to the face 20 of the clamp 18. Spikes 19 are fully extended and bivalve 8 is positioned between clamps 18 but is not in contact with spikes 19.

Figure 3B:
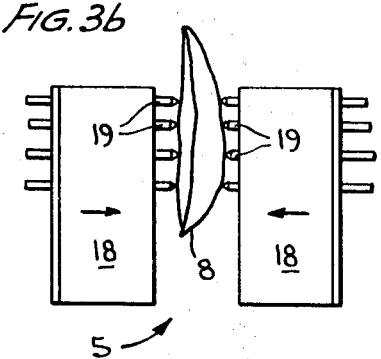

In FIG. 3b clamps 18 are in fully closed position, and bivalve 8 is immovably held by compressed spikes 19.

Figure 3C:
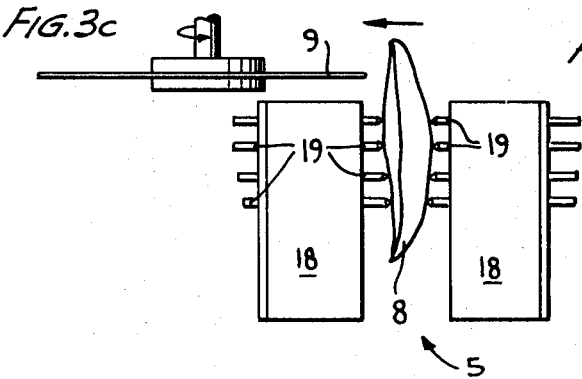

In FIG. 3c carriage and clamp assembly 5, immovably holding bivalve 8, is advancing toward blade 9 which rotates either clockwise or anti-clockwise.

Figure 3D:
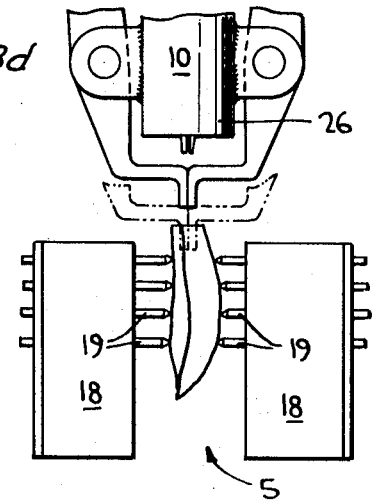

In FIG. 3d carriage and clamp assembly 5 has advanced beyond blade 9, and bivalve 8 with hinge removed is positioned under shell spreader and knife unit 10, which is in upper position. Dotted lines show spreader feet in lower position with spreader closed. Clamps 18 are semi-open, feet of spreaders and partially compressed spikes 19 loosely hold bivalve 8. Knives 25 are sheathed within sleeve 26.

Figure 3E:
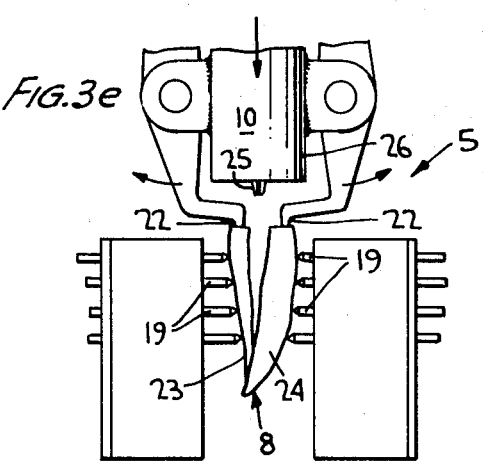

In FIG. 3e shell spreader and knife unit 10 is in lower position, spreader feet 22 are inserted in bivalve 8 approximately five-sixteenths of an inch, forcing apart at their tops shells 23 and 24 of bivalve 8. Spikes 19 are either partially compressed or partially extended to conform with contours of shells 23 and 24 as so forced apart. Knives 25 remain sheathed in sleeve 26.

Figure 3F:
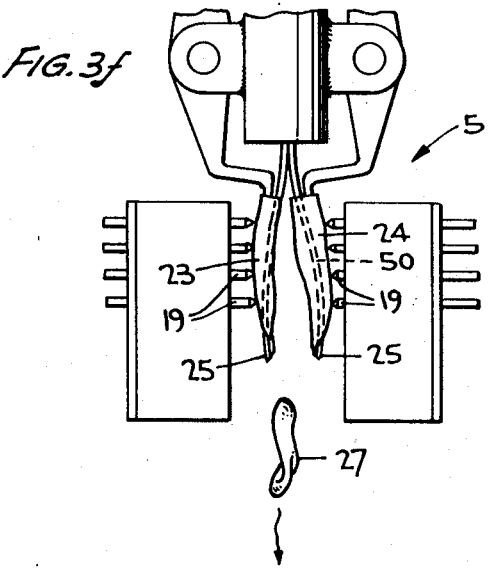

In FIG. 3f knives 25 are in extended position, passing between spreader feet 22, are flexed apart from each other, and have severed the muscles holding meat 27 to shells 23 and 24. The bottoms of shells 23 and 24 are held apart by flexed knives 25 which extend just beyond the lowermost portion of the shells 23 and 24. Spikes 19 are individually compressed in conformation to contours of shells 23 and 24 as held apart at their tops by spreader feet 22 and at their bottoms by knives 25. Meat 27 is shown dropping from its shells.

Figure 3G:
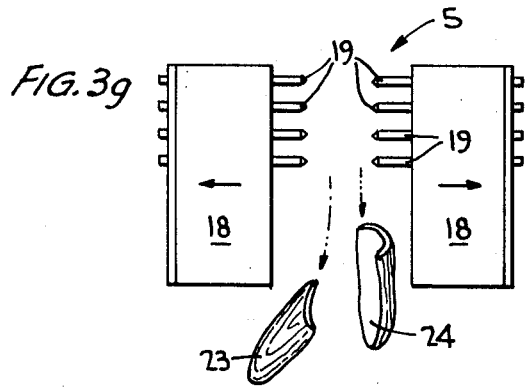

In FIG. 3g carriage and clamp assembly 5 has advanced to the final position. Clamps 18 are again fully open, and empty shells 23 and 24 are released and fall from carriage and clamp assembly 5.

SHELL SPREADER AND KNIFE MECHANISM

FIG. 4 shows oscillating knife shaft mechanism, with oscillating electric motor 28 turning crank wheel 29, connected by crank pin 30 to connecting rod 31. Rod 31 connects to arm 32 attached to oscillating knife shaft 33. Shaft 33 is movable vertically by knife shaft handle 34, acting through Scotch yoke device 35 attached to bearing block 36. Spreader handle 37 by shaft 38 moves cam 39 acting on roller 41 forcing sleeve assembly 42 and knife shaft 33 moving by tracks 48 to descend approximately five-sixteenths of an inch, positioning spreader feet into the opening in the bivalve as shown in FIG. 3d.

In FIG. 5 sleeve assembly 42 is shown in upper position with dotted lines to indicate lower position shown in FIG. 4. Further depression of spreader handle 37 after sleeve assembly is lowered further turns shaft 38 rotating cam 40 which acts on roller 43 forcing wedges 44 to slide downwardly in grooves 49 acting on rollers 45 to compress spreader arms 46 pivoting at 47 forcing apart spreader feet 22 forcing open bivalve 8 as shown in FIG. 3e and FIG. 6.

In FIG. 6 sleeve assembly 42 is in the lower position, spreader feet 22 are apart. Knife shaft 33 has been lowered through sleeve 42 by mechanism shown in top portion of FIG. 4. Knives 25 having spring steel hafts 50 have passed between spreader feet 22 are sprung apart as is also shown in FIG. 3f.

In FIG. 7 the knife assembly is shown with dotted lines illustrating knives 25 apart when spring steel hafts 50 are not compressed together. Adapter 53 is connected to the bottom of knife shaft 33, which fits into the bottom of shaft 33 and is held fast by set screw 52. Pin 51 and adapter 53 are of one-piece construction and are together referred to as the adaptor. Screws 54 and 55 hold the tops of knife hafts 50 in adapter 53. In FIG. 7 adapter 53 is free to slide vertically within sleeve 42. Knives 25 and hafts 50 are one-piece construction, the knives being approximately spade-shaped. FIG. 10 shows knife blade 25 with surface 56 larger than surface 57.

FIG. 11 shows a modification of the knife shown in FIG. 7. The blades 25, lower portions of hafts 50, and the pin portion 51 or adapter 53 are the same as shown in FIG. 7. A pin 96 having a wedge-shaped lower end is slidably fitted into the lower end of adapter 53. A spiral spring 97 fits around pin 96 and butts at its upper end against this lower end of adapter 53 which serves as a boss, and butts at its lower end against a second boss 98 formed by the widened diameter of the lower part of pin 96. Upper end of hafts 50 fit together to form a V-shaped cleft 99, which receives the wedge shaped end of pin 96. Hafts 50 are attached to adapter 53 by screw 100 which also acts as a fulcrum for the hafts 50. Screw 101 also holds hafts 50 in adapter 53, but by means of slots 102. The upper parts of hafts 50 are free to move within sleeve 42 to the extent permitted by the length of slot 102. Thus knive blades 25 may be deflected to a limited extent with screw 100 as the center of rotation.

CARRIAGE AND CLAMP ASSEMBLY

In FIG. 8 carriage and clamp assembly 5 is shown in detail. Assembly 5 is movable horizontally along tracks 3 and 4 by means of pinion 6 attached to shaft 56, which engages rack 7. Shaft 56 is turned by hand wheel 57. Handle 58 is fixed to shaft 59 by pin 60. Cam followers 61 and 62 are fixed to shaft 59 by pin 63. A disk of friction belting material 64 is firmly affixed to the vertical face of the handle hub 65 of handle 58 and makes frictional contact with the opposing vertical face of hub 66. Handle hub 65 is urged against hub 66 by spring 66a and is held in optional positions by frictional contact between friction disk 64 and hub 66. Cams 67 and 68 are slidably attached to shaft 59 and to clamps 18. Spring 69 surrounding shaft 59 push cams 67 and 68 apart. Springs 69 are separated by two collars 70. The operation of handle 58 rotates cam followers 63 causing clamps 18 to move toward or away from each other to grasp or release bivalve 8 by means of spikes 19.

FIG. 9 shows the face 71 or clamp 18 perforated by compressible spikes 19, spiral springs 72 surrounding the enclosed portion of spikes 19, butting against the interior surface of clamp face 71 and against the interior surface of back face 73 of clamp 18. The ends of spikes 19 protrude through back face 73 of clamps 18 which acts as a guide for spikes 19.

FIGS. 12 and 13 show feeder assembly 104 plunger rod 73 penetrating and slidably supported by bearing block 74. Spring 75 surrounding plunger rod 73 butts against bearing block 74 and collar 76 forcing V-shaped clamp 77 fixed to the end of rod 73 into engagement with bivalve 8 forcing the opposite edge of the shell of bivalve 8 into backstop 78. The bottom of bivalve recesses into V-shaped depression 79 in base plate 80. Plunger rod 73 has knob 81 attached to end. Feeder assembly 104 is in fixed position and does not move with carriage and clamp assembly 5.

PHYSICAL FEATURES OF BIVALVE UTILIZED BY INVENTION

FIG. 14 shows a typical American oyster (*Cnassostrea Virginica Gamelin*) with large cup-shaped bottom shell 82 smaller flatter top shell 83, narrow thick hinged end 84, and wider and thinner opposite end 85.

FIG. 15 shows the same oyster shown in FIG. 14 as opened, with bottom shell 82 at left and top shell 83 at right both resting on their exterior surface with hinged end toward bottom of sheet, and with shells divided in quadrants. Hinge 85 and hinge ligament 86 are shown on top and bottom portion of the shells. The "scars" 87 where the single adductor muscle was attached is seen to be in the upper right quadrant of bottom shell 82 and in upper left quadrant of top shell 83.

FIG. 16 represents the bottom shell 82 with hinged end 84 toward top of sheet. Dotted lines indicated the position normally occupied by the meat of the oyster when its hinged end is held uppermost prior to the opening of the oyster. Dotted lines also indicate the approximate lower position occupied by oyster meat after the fluid which normally surrounds the meat its eliminated.

FIG. 17 is the section taken through line 17—17 of FIG. 16 showing the contour of body cavity 88 of oyster after hinged end has been cut off along that line.

FIG. 18 shows the bottom portion 89 and top portion 90 of a typical clam, indicating the point of attachment of each of the two separate adductor muscles as marked by scars 91 and 92. The hinge 93 and hinge ligament 94 are shown as well as the dotted cutting line 95, which shows the portion of the shells which are removed when the invention is practiced.

AUTOMATED MACHINE

FIG. 19 shows a Geneva mechanism having turntable 103 which successively carries bivalve 8, after it is positioned in clamps 18 by feeder assembly 104, to cutting blade 9, shell spreader and knife unit 10, and finally to shell release mechanism 105. Electric motor 106 by conventional mechanism rotates turntable 103. Air cylinder 107 pushes V-clamp 77 inwardly until bivalve 8 is positioned against backstop 78. Air cylinder 108 raises feeder assembly 104 until bivalve 8 touches overhead stop 109. Air cylinder 109a pushes upwardly on shaft 110 and by rack and pinion mechanism 111 fully closes clamps 18 on bivalve 8. Air cylinder 112 pushes upwardly on shaft 113 and moves clamps 18 to semi-open position when bivalve 8 reaches a position directly beneath shell spreader-knife assembly 10. Air cylinder 114 lowers knife shaft 33 when knife has access to adductor muscles of bivalve 8. Turntable 103 next moves clamps 18 holding now empty bivalve shells to shell release mechanism 105 where air cylinder 115 pushes upwardly rod 116, which, by means of rack and pinion mechanism 111, brings clamps 18 to fully open position, thereby discharging empty shells.

DESCRIPTION OF THE PREFERRED EMBODIMENTS

While emphasis will be placed upon the shucking of the American oyster found along the Atlantic and Gulf Coasts, and clams, the invention will also shuck the Japanese oyster *Crassostrea gigas*, now being grown along the Canadian and North Pacific Coast of the United States.

In oyster beds the oyster rests upon its large thick cup-shaped bottom shell, and the thinner, smaller and flatter top shell is attached to the bottom portion at the "beak," or end, by a hinge having a tough ligament. The top and bottom valves or shells are also held together by the adductor muscle, the only attachment between the oyster "meat" or body and the shells. This soft, but very strong muscle, holds the two valves in a very slightly parted position while feeding, or in closed water-tight engagement when the oyster is disturbed. In FIG. 15 the scars indicate the points of attachment of the adductor muscle to the shell interior. Thus, if the oyster is held bottom side down in one's hand with the "beak" end facing one's wrist, the adductor muscle is always found to be attached at the right quadrant of the circular end of the shell.

While cutting off the hinged end of the oyster leaves the two valves which comprise the shell attached only by the adductor muscle, it is not possible to remove more than from one-half to three-quarters of an inch of shell at the beak without cutting into and damaging the portion of the meat which lies close to the hinge. The aperture which is made by such a shallow cut is very small. If, however, the free fluid which is normally entrapped within the bivalve cavity is removed before the shells are cut, the meat no longer "floats" nor is it suspended in the cavity, but sags into the part of the shells which is lowermost, providing an additional one-half to three-quarters of an inch of unoccupied space in the shell cavity below the hinge. In practicing the invention the oyster is forced to release this fluid before the hinge is removed and a much larger portion of the hinged end is cut away without damage to the meat. A very large opening providing accessibility to the attachment points of the adductor muscle or muscles is thereby provided.

As already stated, the prior art teaches many methods of shocking which will cause an oyster to open sufficiently to release the liquid contained in the shell cavity. As the oyster is frequently covered with mud, sand, etc., and requires washing prior to shucking, and as oysters are sometimes attached together in clusters of two or more or have barnacles or other sea growth on shells, a "washer-shocker" may be employed to (a) wash away foreign matter from the shell exterior, (b) break the connections between the individual oysters, and (c) shock the oyster sufficiently to cause the release of entrapped fluid from its interior cavity. A rotary washer, preferably having six sides, may be readily adapted to perform these preliminary operations.

By attaching longitudinal vanes or baffles to the interior of such a washer having the input end slightly higher than the discharge end, the oysters may be fed into the higher end, picked up and dropped repeatedly by the baffles as they progress toward the discharge end, while being sprayed with water. The repeated dropping during the washing process separates most of the attached oysters and sea growths and so stuns their nervous systems as to relax the adductor muscles, causing the shells to part very slightly at the rounded ends and give up the fluid within their shell cavities. As the partial opening of the oyster is induced only after considerable tumbling, there is ample time for all foreign matter to be washed from the shells before this opening occurs. This treatment does not injure the meats as they are held in liquid suspension until the shells are slightly parted as described. After being processed in this manner, the clean oysters may be processed in accordance with the invention which will now be described.

THE FEEDER ASSEMBLY—STATION 1

The oyster is placed by hand into the feeder assembly, hinged and uppermost, cup or bottom of shell facing the right-hand side of the machine, and with the edge of the oyster perpendicular to the tracks on which the carriage and clamp assembly travels. The thin rounded end of the shell is fitted into the V-shaped recess in the base of the feeder and the spring-loaded plunger rod with V-shaped clamp engages the edge of the shell facing the operator and forces the opposite edge firmly against the backstop of the feeder. The oyster is now correctly positioned in the feeder assembly, and the feeder assembly is raised vertically until the beak of the oyster, which is uppermost, touches the stop. This stop, which is adjustable, determines how far the shell will be raised above the clamps of the carriage and clamp assembly, and therefore, how much of the shell will be cut away by the blade. The oyster is now in the correct position to insure that the maximum portion of the hinged end will be removed without injury to the meat and that the angle of the cut will be such as to provide an opening which affords the most direct knife path to the points of attachment of the adductor muscle.

With the oyster now correctly oriented between the open clamp of the carriage and clamp assembly, the cam handle is next moved to the closed position, causing the oyster to be held fast by the compressible spring-loaded spikes, which compress in conformity to the irregular and non-uniform contour of each individual oyster, and which project at right angles from the two parallel clamp faces. The plunger rod of the feeder assembly is next withdrawn by the operator so that it is out of contact with the oyster and the feeder assembly is returned to its lower position, leaving the oyster now securely held between the spikes of the clamps of the carriage and clamp assembly.

SHELL CUTTING OPERATION—STATION 2

The carriage and clamp assembly containing the oyster is moved along the tracks vertically to the left by the rack and pinion mechanism, which is activated by the handwheel, and is thus brought in contact with the diamond edge cutting blade which is so positioned in relation to the tracks as to cut in a horizontal plane about three-eighths of an inch above the top of the clamps. The electrically driven 12-inch blade revolves either clockwise or counter-clockwise at 1,750 r.p.m. and is cooled and cleansed by a jet of cold water which sprays the top and bottom of the blade at the point of contact with the oyster. Rubber wipers on the top and bottom of the blade collect and drain away the water from the machine. Because of the necessity of cutting the shell quickly to accelerate production, the oyster is advanced rapidly through the cutting zone.

As the liquid has been removed from the oyster cavity during the washing-shocking process the meat of the oyster no longer occupies the top portion thereof, permitting the cutting away of the hinge and a considerable portion of the shells below the hinge. The portion of the shells which is removed is intercepted by the rubber wipers described above which guide this portion to a waste receptacle. The angle of the cut produces a large opening at a location which provides excellent access to the quadrants of the shells to which the adductor muscles are attached.

SPREADING OF SHELLS AND ADDUCTOR
MUSCLE CUTTING—STATION 3

After passing through the shell cutting zone, the carriage and clamp assembly, holding the oyster with hinge end removed, is moved to the left by the operation of the handwheel and is stopped when its center is directly beneath the center of the combined shell spreader and knife unit. The cam handle is then moved upwardly to a position midway between the open and closed positions so that the oyster shell is no longer held completely rigid between the now semi-relaxed spikes of the clamps. The spreader handle is then depressed rotating, two cams which perform two successive functions. The first cam acts upon and lowers about five-sixteenths of an inch a sleeve to which the shell spreader is attached. The shell spreader consists of a pair of arms which pivot on the sleeve and terminates in spreader feet. The lowering of the sleeve and attached spreader places the two spreader feet, which are initially close together, within the aperture of the oyster shell made by the cutting blade. After the sleeve with attached spreader is lowered, the second cam, which is on the same shaft, acting upon a roller at the top of a V-shaped wedge, causes the wedge to move downwardly in its vertical tracks and to engage rollers on the ends of the spreader arms opposite the spreader feet. The downward movement of the wedge against these rollers forces apart the spreader feet and with them the two portions of the shells, thereby widening the opening by about one and one-quarter inch. As explained earlier, the semi-open position of the clamps of the carriage and clamp assembly and compressibility of the spikes allow a limited lateral separation of the top portions of the shells which is not possible when the clamps are in the closed position. The use of the spreader is not required when only large oysters or clams are being shucked.

After the opening between the shells is enlarged as described, the knife shaft handle is depressed. This handle is attached by a shaft and yoke arrangement to the knife shaft, a rod which is slidably fitted into the top of the sleeve on which the spreader arms are attached. Within the sleeve the knife shaft is coupled to the two knife hafts which are mounted in tweezer-like relationship. The hafts of these knives are held tightly together at their tops by set screws which hold them into an adapter by which they are linked to the knife shaft. The hafts are of spring steel so shaped as to be separated from each other at their bottoms but converging at their tops like an inverted V. A knife blade is formed at the botom of each haft as an integrel part thereof. This nearly spade-shaped blade is slightly concave and its leading edges are relieved to facilitate sliding engagement with the internal walls of the shell cavity.

A pantograph knife as shown in FIG. 11 may be used for bivalves having unusually irregular interior shell configurations. The blades of this version are movable toward and away from each other in tweezer fashion in the manner already described and either will also deflect sideways as well to conform to interior shell contour while being inserted into the bivalve shell cavity.

Prior to the depression of the knife shaft handle the hafts are completely sheathed within the sleeve, and are compressed together in close relationship throughout their entire length. The blades are not sheathed but are positioned just outside of the lower end of the sleeve and above the spreader feet. Depression of the lever expels the hafts from the sleeve, and the blades remain together until they pass between the open spreader feet and into the expanded opening in the shell as the bowed hafts emerge from the sleeve they spring apart causing the knife blades to separate with considerable pressure against the opposing interior walls of the shell cavity. The knives are so shaped and the oyster is held in such a position by the clamps of the carriage and clamps assembly that the blades follow the contours of the inner shell surfaces to the precise points where the adductor muscle is attached. The knives sever the muscle at both points of attachment and then, continuing to follow the contours of the shell, penetrate deeper into the cavity and ultimately emerge below the lowest edge of the shells. The pressure of the spring hafts upon the blades in the lower part of the oyster cavity forces the shells apart at their bottoms and the meat of the oyster drops out of the shells into a container.

The hafts and blades are next quickly withdrawn from the shells by raising the knife shaft lever. This, of course, causes the hafts to be sheathed in the sleeve, and the spreader feet to come together and to be withdrawn from the now empty shells. The withdrawal of the knife and spreader from the interior of the shells causes the two shells to be brought together again by the pressure exerted by the spring-loaded spikes against the exterior surface of the shells. As thus held the shells are ready to be carried by the carriage and clamp assembly when it is moved to the left to the shell release station.

SHELL RELEASE—STATION 4

The carriage and clamp assembly is next advanced to the final station by further rotation of the handwheel, and is brought to rest over the container or conveyor which receives empty shells. The cam handle is then raised to the open position causing the clamps to open fully and release the shells, which fall into a container or conveyor. The carriage and clamp assembly is returned to station 1 and the process is completed.

SIMULTANEOUS OPERATION OF ALL FOUR STATIONS

Because stations two, three and four can only operate in cooperation with the carriage and clamp assembly which holds the bivalve while it is being processed at these stations, production may be greatly increased by increasing the number of such assemblies so that each station may be operated simultaneously. This, of course, will make it possible for the cutting of the shell, the slowest of the successive steps, to be carried out almost continuously. It is also possible by the use of more than one blade in conjunction with a plurality of carriage and clamp assemblies to increase production to meet almost any demand, since the operations at stations three and four are performed instantaneously.

THE SHUCKING OF CLAMS

The process and apparatus described may be employed with minor modifications in the shucking of raw clams. The principal difference between the problem encountered in shucking oysters and clams is that the latter has two adductor muscles rather than one. The location of these muscles is shown in FIG. 18. While there are different positions in which clams may be held in the clamps to practice the invention, the preferred method is to place uppermost the portion of the shell which contains the hinge as is done with oysters. This will result in a blade cut as indicated by the dotted line in FIG. 18, which removes both the hinge 93 and hinge ligament 94. After this blade cut has been made the shells are held together by two muscles instead of one as in an oyster. In order that the knife will reach and sever both ends of each of the two adductor muscles the knife is made to oscillate in a semi-circular orbit by a mechanism, to be described, as it is lowered into the interior of the clam cavity.

OSCILLATING KNIFE

By the use of mechanism such as shown in FIG. 4 the knife blades may be caused to oscillate within the clam cavity by a partial rotation and counterrotation of the knife shaft. The arc of rotation of the blades within the cavity must be sufficient to insure that the blades contact the entire length of the cavity in each direction. This produces a broad knife path and is particularly suitable for use when shucking clams.

PARTIAL SHUCKINGS OF BIVALVES

The invention will also produces oysters or clams "on the half shell" when a knife having but a single blade is used at Station 3. This variation removes only one shell leaving the meat attached to the other shell. When so modified "ready to serve" bivalves are produced which may be marketed fresh or after freezing.

We claim:

1. An apparatus for shucking bivalves comprising means for holding in an upright position the bivalve shells means for making an opening in said shells by removing the portions thereof which are held uppermost; means for insertion through said opening for severing the adductor muscle or muscles of said bivalve where attached to said shells, and for forcing apart the bottom portions of said shells sufficiently to allow said edible portion to drop clear of said shells between the bottom portions; and carrier means for moving said bivalve holding means in a path in which the bivalve is brought into engagement with said means for making said opening, and with said means for severing said adductor muscle, said carrier means holding the bivalve in such upright position throughout said path.

2. An apparatus for shucking bivalves as in claim 1, having means for penetrating and widening the said opening made in said shells, while said bivalve is stationed directly beneath said means for severing said adductor muscle or muscles.

3. An apparatus for shucking bivalves as in claim 1, wherein said carrier means is a Geneva mechanism.

4. An apparatus for shucking bivalves as in claim 1, which includes pneumatic means for operating: (a) the means for placing and holding the bivalve in a selected position, and for releasing shells, (b) means for severing adductor muscles and for forcing apart the bottom portions of shells.

5. An apparatus for shucking bivalves as in claim 1, having a plurality of said means for holding bivalves and/or said means for making an opening in the shell.

6. An apparatus for shucking bivalves as in claim 1, wherein the means for holding bivalves is a clamp containing resilient spikes by which said bivalve is held optionally either immovably when said clamps are fully closed or flexibly when said clamps are intermediate their fully open and fully closed positions.

7. An apparatus for shucking bivalves as in claim 1, wherein said means for severing the adductor muscle is a pair of knives which oscillate in an arc while in contact with the interior of the shell cavity of said bivalve, which arc conforms to the contours of said interior of said shell cavity.

8. An apparatus for shucking bivalves comprising means for holding a bivalve in a position with its hinge at the top, means at one station for removing the topmost portion of the bivalve while held by said holding means to provide a hole in the top, means at a later station movable into said hole to sever at least any adductor muscle on one of the shells of the bivalve, and means to move the bivalve from the one station to the later station.

9. An apparatus as claimed in claim 8 further including stationary means at said later station engageable in said opening and operable before the operation of said severing means to spread apart the halves of the shell adjacent said opening.

10. An apparatus as claimed in claim 9 in which said bivalve is held at said later station with the hole directed upwardly and said severing means includes means to sever the adductor muscles on both shells and for forcing apart the bottom portions of said shells, whereby the meat can drop out between said parted bottom portions.

11. In an apparatus for shucking bivalves, means for opening a pair of shells having the hinge portion removed therefrom to provide a hole in the shells and to remove the edible portion of the bivalve from such shells, comprising means to hold the bivalve with the hole upwardly directed, members mounted to enter the hole while the bivalve is so held and engage the inside of each of the shells on opposite sides of the edges of the hole, means to move said members apart to enlarge the hole, and means enterable into the enlarged hole while the bivalve is so held for first severing the adductor muscles and then spreading apart the lower ends of the shells, whereby the meat can drop out between the parted lower ends.

12. In an apparatus as claimed in claim 11, said severing and spreading means including a pair of knives, means mounting the knives for downward movement into the bivalve through said hole, said mounting means causing the lower end portions of the knives to remain close together until they have passed between said members and thereafter to spread apart against the interior of the walls of the bivalve where the adductor muscles are located.

13. In an apparatus for shucking bivalves having the hinge portion removed therefrom to provide a hole in the shells, means for holding the bivalve with the hole uppermost, means for moving the bivalves while held by said holding means in a path, stationary means operable on the bivalve while so held in said paths for severing the adductor muscles comprising a pair of resilient knives having their lower ends urged apart, means mounting the knives for movement into the shell through said hole, said mounting means causing the lower ends of the knives to remain close together until they have passed through the hole and thereafter to spread apart against the inside of the parts of the walls of the bivalve where the adductor muscles are located to sever the adductor muscles.

14. Apparatus for shucking bivalves comprising means to grip a bivalve in an upright position, means to move the bivalve so gripped in a substantially horizontal path, means engageable with a bivalve in such path to cut off the upper parts of the shells of the bivalve, and stationary means adjacent a later portion of the path for removing the meat from the bivalve.

15. Apparatus as claimed in claim 14, said removing means comprising means enterable into the hole for severing the adductor muscles including a pair of knives, and means mounting the knives for downward movement into the bivalve through said hole, said mounting means causing the lower end portions of the knives to remain close together until they have passed between said members and thereafter to spread apart against the interior of the walls of the bivalve where the adductor muscles are located.

16. Apparatus as claimed in claim 14, including means to hold the bivalve in a position with its cut-off top upwardly directed while it is operated on by said removing means.

17. In apparatus for shucking bivalves having a hole cut in the top thereof, means for holding the bivalve in upright position with the hole uppermost, and means enterable into the hole for severing the adductor muscles including a pair of knives, and means mounting the knives for downward movement into the bivalve through said hole, said mounting means causing the lower end portions of the knives to remain close together until they have passed between said members and thereafter to spread apart against the interior of the walls of the bivalve where the adductor muscles are located.

18. In apparatus for shucking bivalves having a hole cut in the top thereof, means for holding the bivalve in upright position with the hole uppermost, and means enterable into the hole for severing the adductor muscles and for thereafter spreading apart the lower ends of the shells, whereby the meat can drop out between the parted lower ends.

19. In a machine for shucking bivalves, means to hold a bivalve having a hole in its top in upright position, and adductor muscle severing means comprising a pair of knives with elongated stems and blades at the lower ends of the stems, guide means holding said knives normally with their stems close together and substantially parallel to each other, said stems being of resilient material and being tensioned to tend to spread away from each other at their lower ends, said guide means permitting downward movement of the knives and including means to hold the blades substantially together until they have entered the hole and thereafter to permit the blades to spread apart against the inner walls of the shells.

References Cited
UNITED STATES PATENTS

| | | | |
|---|---|---|---|
| 848,784 | 4/1907 | Torsch et al. | 17—74 |
| 2,808,613 | 10/1957 | Palmere | 17—76 |
| 3,206,797 | 9/1965 | Smith, Jr. | 17—74 |
| 3,239,877 | 3/1966 | Lapeyre et al. | 17—74 |
| 3,303,527 | 2/1967 | Lanier | 17—74 |

LUCIE H. LAUDENSLAGER, Primary Examiner

U.S. Cl. X.R.

17—48